United States Patent [19]

Danner

[11] 4,384,765
[45] May 24, 1983

[54] SIX-COMPONENT MICROSCOPE OBJECTIVE

[75] Inventor: Lambert J. Danner, Vienna, Austria

[73] Assignee: C. Reichert Optische Werke, AG, Vienna, Austria

[21] Appl. No.: 322,056

[22] Filed: Nov. 16, 1981

[51] Int. Cl.³ ............................................. G02B 21/02
[52] U.S. Cl. ............................................................ 350/414
[58] Field of Search ................................ 350/414, 464

[56] References Cited

U.S. PATENT DOCUMENTS

| | | | |
|---|---|---|---|
| 3,822,931 | 7/1974 | Matsubara | 350/414 |
| 4,261,654 | 4/1981 | Rybicki | 350/414 |

*Primary Examiner*—John K. Corbin
*Assistant Examiner*—Scott J. Sugarman
*Attorney, Agent, or Firm*—Alan H. Spencer

[57] ABSTRACT

An infinity-corrected, semi-apochromatic microscope objective having an N.A. of 0.95 has five elements and provides a magnification of 100× when used with a telescope objective having an effective focal length (efl) of 183 mm.

1 Claim, 1 Drawing Figure

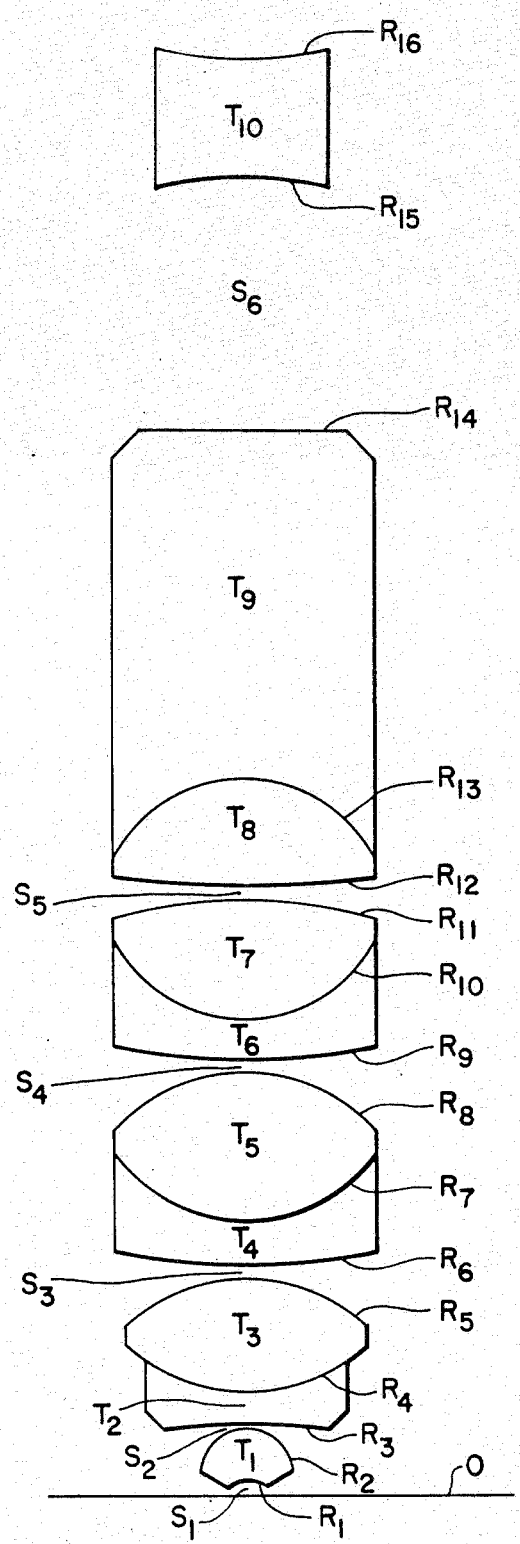

SIX-COMPONENT MICROSCOPE OBJECTIVE

BACKGROUND OF THE INVENTION

This invention relates to microscope objectives and more particularly to infinity-corrected microscope objectives having an N.A. of substantially 0.95.

It is an object of this invention to provide objectives well corrected for all aberrations except lateral chromatic aberration. The residual lateral chromatic aberration between 486.1 nm and 656.3 nm is 1% of the angular magnification at 589.3 nm across usable field.

When used with a telescope lens having an effective focal length (efl) of 183 mm, the objective provides a lateral magnification of substantially 100× at 589.3 mm.

U.S. Pat. No. 3,822,931 issued July 9, 1974 relates to a six-component microscope objective having a magnification of 100× and an N.A. of 0.9. The objective of the reference differs substantially from the present invention in that the reference provides that the second, third and fifth components are singlets while the corresponding components are doublets according to the present invention. Furthermore, the final or sixth component is a convex concavo singlet in the reference while the final component is a bi-concavo singlet in the present invention.

U.S. Pat. No. 4,261,654 issued April 14, 1981 is the closest reference to the claimed structure of the present invention. While there is substantial similarity between the first, second, third and fourth components of the reference, there is a substantial disparity between the fifth and sixth components of the reference and the fifth and sixth components of the present invention. Specifically, it is noted that the fifth component of the reference comprises a convex-concavo element cemented to a convex-concavo element to provide a convex-concavo doublet while the fifth component of the present invention is a bi-convex singlet as the first element cemented to a concavo plano second element to provide a convex plano doublet. Also, the reference provides a bi-convex doublet while the present invention requires a bi-concave singlet.

THE DRAWING

FIG. 1 is an optical diagram of the objective according to the present invention.

SUMMARY OF THE INVENTION

The first lens I is a concavo-convex singlet followed by a concavo-convex doublet II followed by a bi-convex doublet III followed by a bi-convex doublet IV, a convex plano doublet V and a bi-concave singlet VI.

DESCRIPTION OF THE PREFERRED EMBODIMENT

With respect to lens parameters, the axial thickness of successive lens elements are designated $T_1$ to $T_{10}$ and the axial spaces from the object plane designated O are $S_1$ to $S_6$. The successive lens radii are designated $R_1$-$R_{16}$ where a minus sign (−) applies to surfaces whose center of curvature lies on the object side of the vertices. The refractive indexes and Abbe numbers of the glass in the successive lenses are designated $ND_1$ to $ND_{10}$ and $\nu_1$ to $\nu_{10}$.

TABLE I

| Lens No. | Radius (R) | Thickness (T) | Spacing (S) |
|---|---|---|---|
| I |  |  | $S_1$ = 0.28 |
|  | $R_1$ = −1.143 |  |  |
|  |  | $T_1$ = −1.73 |  |
|  | $R_2$ = 1.517 |  |  |
| II |  |  | $S_2$ = 0.10 |
|  | $R_3$ = −32.927 |  |  |
|  |  | $T_2$ = 1.10 |  |
|  | $R_4$ = 5.980 |  |  |
|  |  | $T_3$ = 3.60 |  |
|  | $R_5$ = −5.506 |  |  |
| III |  |  | $S_3$ = 0.30 |
|  | $R_6$ = 22.311 |  |  |
|  |  | $T_4$ = 1.45 |  |
|  | $R_7$ = 5.698 |  |  |
|  |  | $T_5$ = 4.70 |  |
|  | $R_8$ = −5.812 |  |  |
| IV |  |  | $S_4$ = 0.50 |
|  | $R_9$ = 33.070 |  |  |
|  |  | $T_6$ = 1.30 |  |
|  | $R_{10}$ = 4.764 |  |  |
|  |  | $T_7$ = 4.00 |  |
|  | $R_{11}$ = −17.305 |  |  |
| V |  |  | $S_5$ = 0.20 |
|  | $R_{12}$ = 116.294 |  |  |
|  |  | $T_8$ = 3.50 |  |
|  | $R_{13}$ = −5.200 |  |  |
|  |  | $T_9$ = 11.30 |  |
|  | $R_{14}$ = ∞ |  |  |
| VI |  |  | $S_6$ = 8.00 |
|  | $R_{15}$ = −36.446 |  |  |
|  |  | $T_{10}$ = 4.00 |  |
|  | $R_{16}$ = 13.612 |  |  |

| Lens No. | Index of Refraction (ND) | Abbe No. (ν) |
|---|---|---|
| I | $ND_1$ = 1.772 | $\nu_1$ = 49.6 |
| II | $ND_2$ = 1.717 | $\nu_2$ = 29.5 |
|  | $ND_3$ = 1.697 | $\nu_3$ = 56.4 |
| III | $ND_4$ = 1.788 | $\nu_4$ = 47.4 |
|  | $ND_5$ = 1.434 | $\nu_5$ = 95.6 |
| IV | $ND_6$ = 1.785 | $\nu_6$ = 26.1 |
|  | $ND_7$ = 1.434 | $\nu_7$ = 95.6 |
| V | $ND_8$ = 1.717 | $\nu_8$ = 29.5 |
|  | $ND_9$ = 1.564 | $\nu_9$ = 60.8 |
| VI | $ND_{10}$ = 1.609 | $\nu_{10}$ = 46.4 |

I claim:

1. An apochromatic microscope objective having an N.A. of substantially 0.95 which comprises a concavo-convex singlet I, a concavo-convex doublet II, a concavo-convex doublet III, a concavo-convex doublet IV, a convex plano doublet V and a bi-convex singlet VI aligned sequentially on an optical axis and having the following parameters:

| Lens No. | Radius (R) | Thickness (T) | Spacing (S) |
|---|---|---|---|
| I |  |  | $S_1$ = 0.28 |
|  | $R_1$ = −1.143 |  |  |
|  |  | $T_1$ = 1.73 |  |
|  | $R_2$ = −1.517 |  |  |
| II |  |  | $S_2$ = 0.10 |
|  | $R_3$ = −32.927 |  |  |
|  |  | $T_2$ = 1.10 |  |
|  | $R_4$ = 5.980 |  |  |
|  |  | $T_3$ = 3.60 |  |
|  | $R_5$ = −5.506 |  |  |
| III |  |  | $S_3$ = 0.30 |
|  | $R_6$ = 22.311 |  |  |
|  |  | $T_4$ = 1.45 |  |
|  | $R_7$ = 5.698 |  |  |
|  |  | $T_5$ = 4.70 |  |
|  | $R_8$ = −5.812 |  |  |
| IV |  |  | $S_4$ = 0.50 |
|  | $R_9$ = 33.070 |  |  |

-continued

| | | |
|---|---|---|
| | | $T_6 = 1.30$ |
| | $R_{10} = 4.764$ | |
| | | $T_7 = 4.00$ |
| | $R_{11} = -17.305$ | |
| V | | $S_5 = 0.20$ |
| | $R_{12} = 116.294$ | |
| | | $T_8 = 3.50$ |
| | $R_{13} = -5.200$ | |
| | | $T_9 = 11.30$ |
| | $R_{14} = \infty$ | |
| VI | | $S_6 = 8.00$ |
| | $R_{15} = -36.446$ | |
| | | $T_{10} = 4.00$ |

-continued $R_{16} = 13.612$

| Lens No. | Index of Refraction (ND) | Abbe No. ($\nu$) |
|---|---|---|
| I | $ND_1 = 1.772$ | $\nu_1 = 49.6$ |
| II | $ND_2 = 1.717$ | $\nu_2 = 29.5$ |
| | $ND_3 = 1.697$ | $\nu_3 = 56.4$ |
| III | $ND_4 = 1.788$ | $\nu_4 = 47.4$ |
| | $ND_5 = 1.434$ | $\nu_5 = 95.6$ |
| IV | $ND_6 = 1.785$ | $\nu_6 = 26.1$ |
| | $ND_7 = 1.434$ | $\nu_7 = 95.6$ |
| V | $ND_8 = 1.717$ | $\nu_8 = 29.5$ |
| | $ND_9 = 1.564$ | $\nu_9 = 60.8$ |
| VI | $ND_{10} = 1.609$ | $\nu_{10} = 46.4$ |

* * * * *